United States Patent
Kamiya

(10) Patent No.: US 7,560,843 B2
(45) Date of Patent: Jul. 14, 2009

(54) VEHICLE DRIVE SYSTEM INCLUDING A ROTATING ELECTRIC MACHINE AND VEHICLE INCORPORATING THE SAME

(75) Inventor: Munehiro Kamiya, Anjo (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 386 days.

(21) Appl. No.: 10/586,479

(22) PCT Filed: Nov. 14, 2005

(86) PCT No.: PCT/JP2005/021200

§ 371 (c)(1),
(2), (4) Date: Jul. 18, 2006

(87) PCT Pub. No.: WO2006/054676

PCT Pub. Date: May 26, 2006

(65) Prior Publication Data

US 2007/0152529 A1    Jul. 5, 2007

(30) Foreign Application Priority Data

Nov. 17, 2004   (JP)   ............................. 2004-333527

(51) Int. Cl.
*H02K 17/00* (2006.01)
(52) U.S. Cl. ...................... 310/166; 310/168
(58) Field of Classification Search ................. 310/166, 310/168, 171, 264
See application file for complete search history.

(56) References Cited

U.S. PATENT DOCUMENTS

| | | | |
|---|---|---|---|
| 4,748,362 A * | 5/1988 | Hedlund ...................... 310/168 |
| 5,122,697 A * | 6/1992 | Horst .......................... 310/181 |
| 5,239,217 A * | 8/1993 | Horst ............................ 310/51 |
| 5,747,962 A | 5/1998 | Fulton |
| 5,844,346 A | 12/1998 | Kolomeitsev et al. |
| 5,917,263 A * | 6/1999 | Sakuma et al. ............... 310/261 |
| 5,920,161 A * | 7/1999 | Obara et al. ................. 318/139 |
| 6,093,993 A | 7/2000 | McClelland |
| 6,777,844 B2 * | 8/2004 | Selewski et al. ............. 310/193 |
| 6,787,958 B1 * | 9/2004 | Walter ......................... 310/168 |

(Continued)

FOREIGN PATENT DOCUMENTS

EP   0 734 117 A2   9/1996

(Continued)

*Primary Examiner*—Hae Moon Hyeon
(74) *Attorney, Agent, or Firm*—Oliff & Berridge PLC

(57) ABSTRACT

A rotating electric machine includes a stator and a rotor. The tip of a salient pole portion of the rotor is bilaterally asymmetrically provided with a cut. The effect of the cut reduces torque ripple during a regenerative running mode. The regenerative running mode is not performed during low speed running but is often performed during high speed running and the driver is more sensitive to in the regenerative running mode noise than in a power running mode. As for the regenerative running mode, measures against torque ripple are taken based on the structure of the rotating electric machine. Preferably, as for the power running mode which bothers the driver about noise during very low speed running, a controller allows a compensation current to be fed to take measures against torque ripple. A compact and high power vehicle drive system with torque ripple reduced and a vehicle incorporating the vehicle drive system can be provided.

10 Claims, 6 Drawing Sheets

U.S. PATENT DOCUMENTS

| | | | |
|---|---|---|---|
| 7,095,150 B2 * | 8/2006 | Norell et al. | 310/194 |
| 7,276,830 B2 * | 10/2007 | Lefley | 310/166 |
| 7,425,808 B2 * | 9/2008 | Kamiya | 318/376 |
| 7,429,847 B2 * | 9/2008 | Yamada et al. | 318/799 |

FOREIGN PATENT DOCUMENTS

| | | |
|---|---|---|
| EP | 0 961 390 A2 | 12/1999 |
| EP | 1 130 740 A2 | 9/2001 |
| JP | A-62-260587 | 11/1987 |
| JP | A-01-122355 | 5/1989 |
| JP | A-09-285086 | 10/1997 |
| JP | A-11-308828 | 11/1999 |
| JP | A-2000-152577 | 5/2000 |
| JP | A-2000-350310 | 12/2000 |
| JP | A-2001-112200 | 4/2001 |
| JP | A-2001-128400 | 5/2001 |
| JP | A-2001-186693 | 7/2001 |
| JP | A-2001-238417 | 8/2001 |
| JP | A-2003-504996 | 2/2003 |
| WO | WO 97/39512 A1 | 10/1997 |
| WO | WO 01/03272 A1 | 1/2001 |
| WO | WO 02/097954 A1 | 12/2002 |

* cited by examiner

ROTATION DIRECTION OF ROTOR
(MOVING FORWARD)

FIG.7
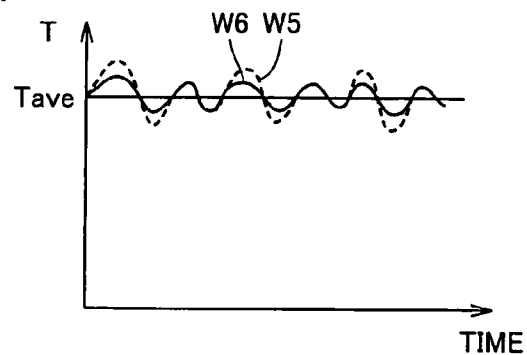
FIG.8
|  | TORQUE RIPPLE RATIO | |
|---|---|---|
|  | REGENERATIVE RUNNING FORWARD ROTATION | POWER RUNNING FORWARD ROTATION |
| BEFORE MEASURES AGAINST TORQUE RIPPLE (WITHOUT CUT IN TIP PORTION) | 67% | |
| AFTER MEASURES AGAINST TORQUE RIPPLE | 23% | 80% |
FIG.9
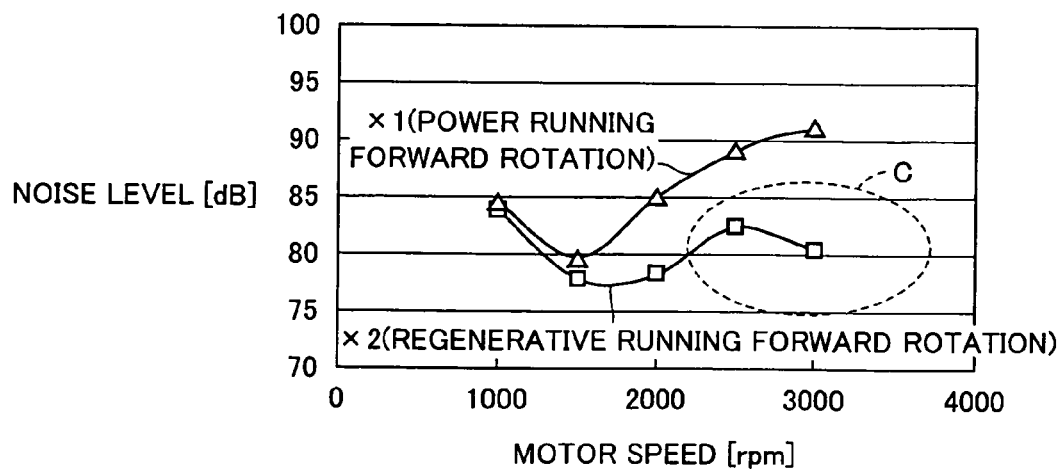

VEHICLE DRIVE SYSTEM INCLUDING A ROTATING ELECTRIC MACHINE AND VEHICLE INCORPORATING THE SAME

INCORPORATION BY REFERENCE

This application claims priority to JP 2004-333527filed in Japan on Nov. 17, 2004, and PCT/JP2005/021200 filed Nov. 14, 2005, the disclosures of which are hereby incorporated by reference in their entirety.

TECHNICAL FIELD

The present invention relates to a vehicle drive system and a vehicle incorporating the vehicle drive system, and more particularly to a vehicle drive system including a rotating electric machine and a vehicle incorporating the vehicle drive system.

BACKGROUND ART

In recent years, there is a need for a compact and efficient motor serving as a driving motor for an electric vehicle, a hybrid vehicle and the like. For this purpose, various kinds of motors such as a synchronous reluctance motor and an embedded magnet synchronous motor have been studied.

However, the reluctance motor, which causes a relatively large torque ripple, poses a problem of a loud noise and strong vibration when it is used as a driving motor. The noise and vibration of the motor is considered to be related to the torque ripple.

Japanese Patent Laying-Open No. 2000-152577 discloses a technology for reducing such torque ripple of the reluctance motor. In this technology, in order to reduce torque ripple, the tip surface of a salient pole of a rotor is rounded off to allow the inductance of an armature winding to be changed in the shape of a sine wave.

However, as disclosed in Japanese Patent Laying-Open 2000-152577, if the measures against torque ripple are taken by structuring the salient pole of the rotor of the motor in bilateral symmetry, average torque will be reduced. Therefore, in order to produce large torque, it is necessary to provide a larger-diameter rotor. Such a larger-diameter rotor will prevent downsizing of the motor.

DISCLOSURE OF THE INVENTION

An object of the present invention is to provide a compact and high power vehicle drive system with torque ripple reduced, and a vehicle incorporating the vehicle drive system.

In summary, the present invention is a vehicle drive system including a rotating electric machine having a structure capable of rotating about an output shaft in a forward direction and in a reverse direction in which torque ripple is smaller than that in the forward direction, and a rotation shaft rotating in the direction to move the vehicle forward according to the rotation of the output shaft in the forward direction.

Preferably, the rotating electric machine includes a stator and a rotor shaped to cause smaller torque ripple when rotating in the reverse direction than in the forward direction.

More preferably, the rotor has a plurality of salient pole portions, and each tip portion of the plurality of salient pole portions has a large chipped portion at a corner on the side in the reverse direction relative to a corner on the side in the forward direction.

Preferably, the vehicle drive system further includes a direct-current power source, an inverter placed on a current feeding and receiving path between the direct-current power source and the rotating electric machine, and a control unit gaining rotation information from the rotating electric machine to control the inverter. The control unit controls the inverter such that torque in the forward direction is produced in the rotor in response to an acceleration instruction to cause the rotating electric machine to run in a power mode, and torque in the reverse direction is produced in the rotor in response to a deceleration instruction to cause the rotating electric machine to run in a regenerative mode.

Preferably, the vehicle drive system further includes a direct-current power source, an inverter placed on a current feeding and receiving path between the direct-current power source and a rotating electric machine, and a control unit gaining rotation information from the rotating electric machine to control the inverter. The control unit instructs the inverter to feed a compensation current in accordance with the rotation information so as to reduce torque ripple of the rotating electric machine in a part of a rotation region when the rotating electric machine runs in the power mode to allow the vehicle to move forward.

More preferably, the part of the rotation region is a rotation region which corresponds to a region in which the vehicle runs in a creep state.

According to another aspect of the present invention, a vehicle includes any of the above-described vehicle drive systems, and a wheel connected to the rotation shaft.

According to the present invention, a reduction in torque ripple allows a reduction in noise which is caused in a regenerative running mode and bothers the driver.

Also preferably, in combination with the control by a compensation current, it is possible to reduce torque ripple caused in a power running mode.

BRIEF DESCRIPTION OF THE DRAWINGS

FIG. 7 is a diagram for describing an improvement of torque ripple in the case where a cut is provided in the salient pole.

FIG. 8 is a diagram showing variation in a torque ripple ratio before and after a cut is provided at a tip portion.

FIG. 9 is a diagram showing an actual measurement example of a noise level of the vehicle drive system of the present invention.

BEST MODES FOR CARRYING OUT THE INVENTION

Figure 1:
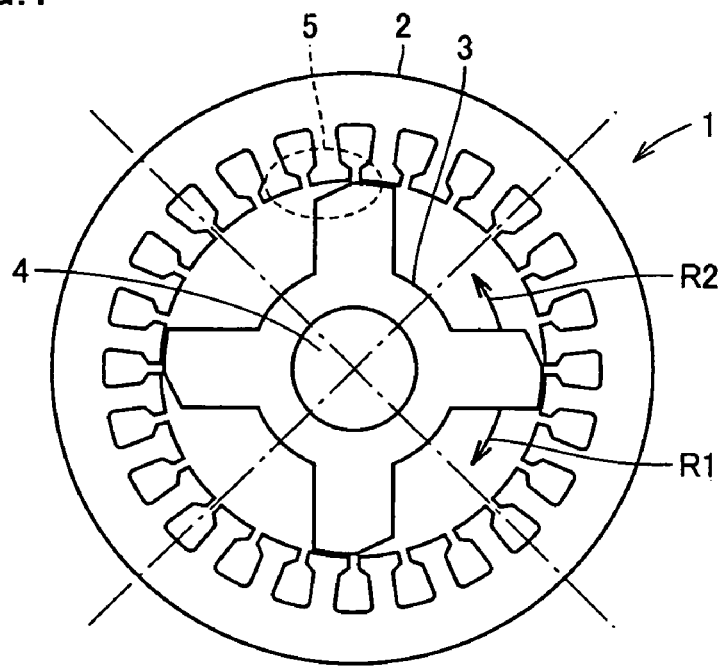
FIG. 1 is a cross-sectional view showing a shape of a rotating electric machine 1 used in a vehicle drive system of the present invention.

The embodiments of the present invention will be hereinafter described in detail with reference to the accompanying drawings, in which the same or corresponding components are designated by the same reference characters, and description thereof will not be repeated.

FIG. 1 is a cross-sectional view showing a shape of a rotating electric machine 1 used in a vehicle drive system of the present invention.

Referring to FIG. 1, rotating electric machine 1 includes a stator 2 and a rotor 3.

Each of stator 2 and rotor 3 is formed of stacked electromagnetic sheet steel. The central portion of rotor 3 is provided with a rotation shaft 4 penetrating through the center of the electromagnetic sheet steel. Rotating electric machine 1 operates as a motor in a power running mode for driving a vehicle and operates as a generator in a regenerative running mode for braking the vehicle.

Rotor 3 is a four-pole rotor with two pairs of salient poles formed. Each tip of the salient poles has a bilaterally asymmetrical shape, and only one side of the tip is provided with a cut, that is, a chipped portion. The effect of this cut causes a rotation direction R1 producing large torque ripple and a rotation direction R2 producing small torque ripple when rotating electric machine 1 rotates as a motor.

In the present invention, rotating electric machine 1 is installed in the vehicle so that the vehicle moves forward as the motor rotates in rotation direction R1 that produces large torque ripple.

Figure 2:
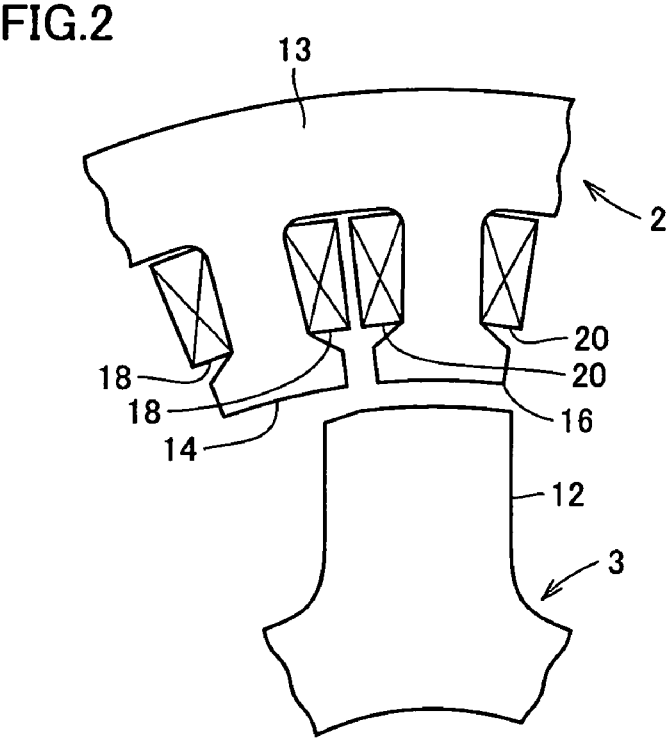
FIG. 2 is an enlarged view showing the vicinity of a part 5 surrounded by a dashed line in FIG. 1.

FIG. 2 is an enlarged view showing the vicinity of a part 5 surrounded by a dashed line in FIG. 1.

Referring to FIG. 2, rotor 3 is provided with a salient pole portion 12. Stator 2 includes a stator yoke 13, stator cores 14, 16 connected to stator yoke 13, a coil 18 wound around stator core 14, and a coil 20 wound around stator core 16.

Figure 3:
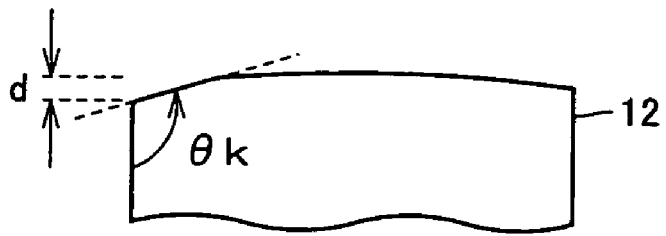
FIG. 3 is an enlarged view showing a salient pole portion 12 of a rotor in FIG. 2.

FIG. 3 is an enlarged view showing salient pole portion 12 of the rotor in FIG. 2.

Referring to FIG. 2, a cut is provided at the corner of salient pole portion 12 on the side opposite to the rotation direction of the rotor while the vehicle moves forward. The cut is formed such that the angle between the side wall of the salient pole portion and the slant is θk about a point that is located distant by a length d from the tip portion towards the center of the rotor. Salient pole portion 12 has a bilaterally asymmetrical shape with respect to the central axis of salient pole portion 12. The central axis extends from the rotation center of the rotor to the midpoint of the tip of salient pole portion 12.

Figure 4:
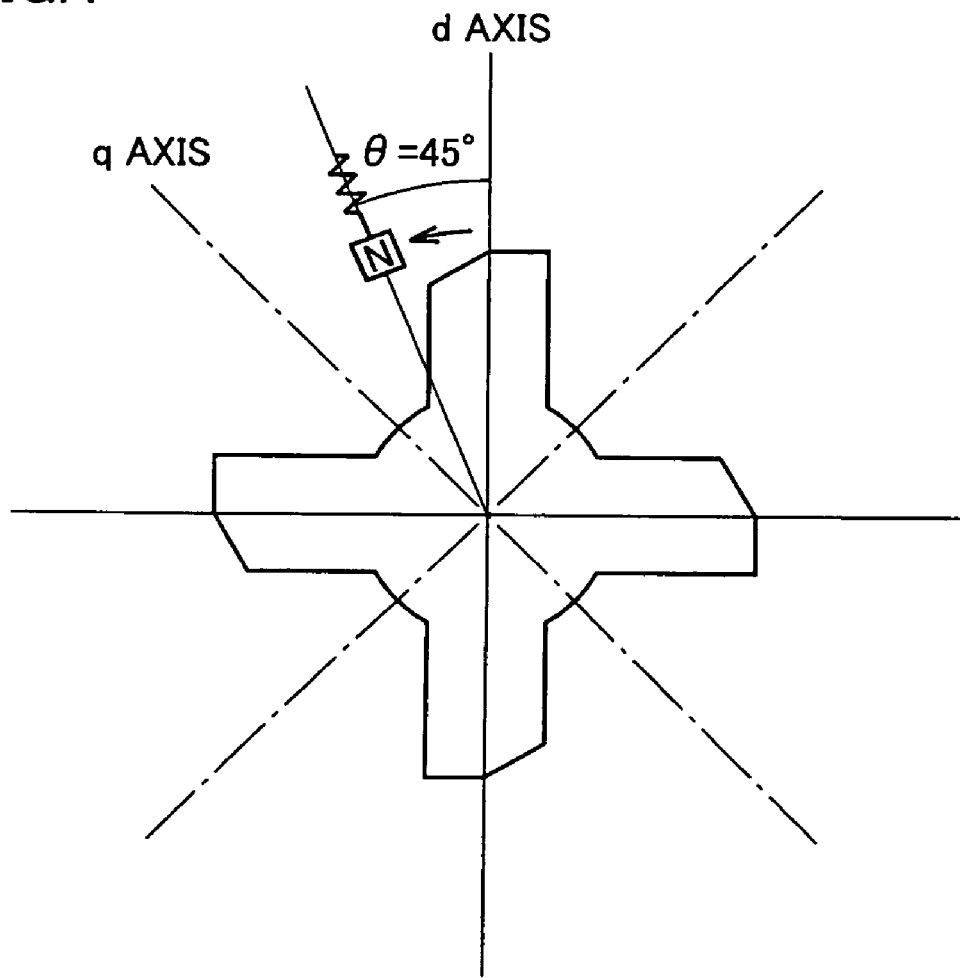
FIG. 4 is a diagram showing a positional relationship between a salient pole and an excited coil of a stator.

FIG. 4 is a diagram showing a positional relationship between the salient pole and an excited coil of the stator.

Figure 5:
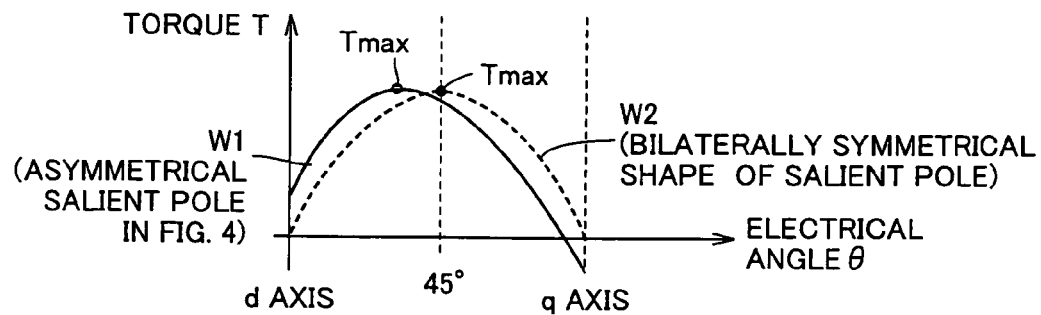
FIG. 5 is a diagram for describing the magnitude of torque caused in the rotor.

FIG. 5 is a diagram for describing the magnitude of torque caused in the rotor.

Referring to FIGS. 4 and 5, a relation between an electrical angle θ from a d axis to a q axis and a torque T is shown in a waveform W2 in the case where the rotor has a bilaterally symmetrical shape of the salient pole. In contrast, in the case of the bilaterally asymmetrical salient pole as shown in FIG. 4, the waveform is shifted towards d axis as shown in a waveform W1. This is because the balance between the force attracting the cut portion in the salient pole and the force attracting the portion absent of a cut in the adjacent salient pole changes.

On the other hand, it is assumed that, if the rotor is provided with a cut, an iron core that is attracted to an excited magnetic pole is reduced in size by the cut to thereby reduce torque itself. Therefore, if the cut is provided, torque ripple is improved, though torque is reduced.

Figure 6:
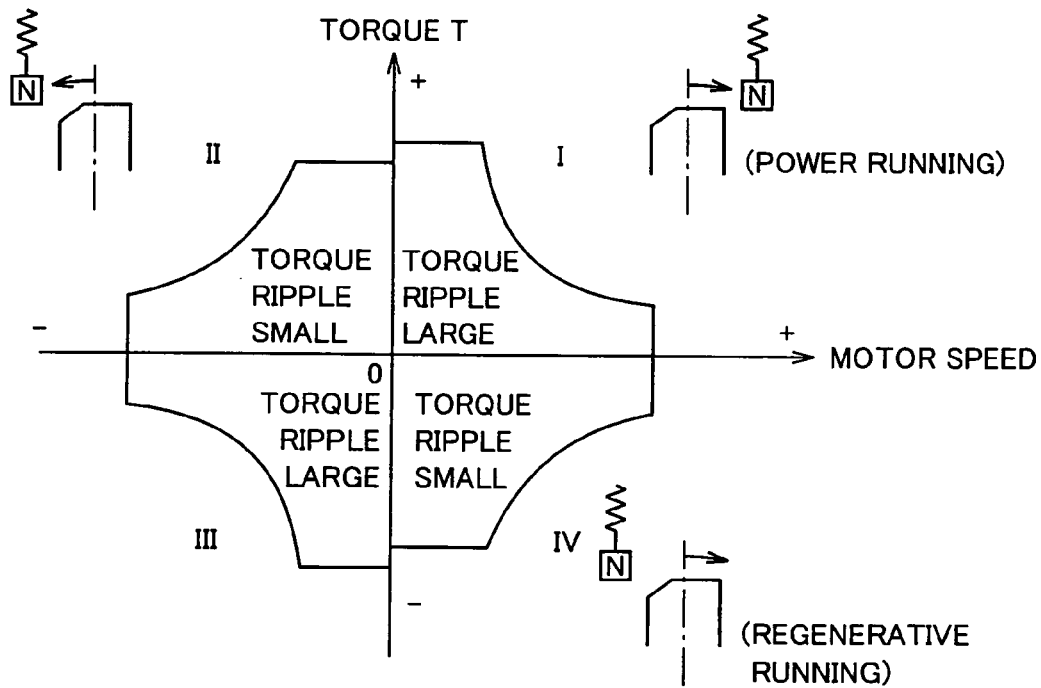
FIG. 6 is a diagram showing operating characteristics when controlling the maximum power of the rotating electric machine used in the present invention.

FIG. 6 is a diagram showing operating characteristics when controlling the maximum power of the rotating electric machine used in the present invention.

Referring to FIG. 6, the first quadrant represents an operating state in which the motor speed is plus and torque is also plus, the second quadrant represents an operating state in which the motor speed is minus and torque is plus, the third quadrant represents an operating state in which the motor speed is minus and torque is also minus, and the fourth quadrant represents an operating state in which the motor speed is plus and torque is minus.

In other words, the first quadrant represents a power running mode when the vehicle moves forward, the second quadrant represents a power running mode when the vehicle moves backward, the third quadrant represents a regenerative running mode when the vehicle moves backward, and the fourth quadrant represents a regenerative running mode when the vehicle moves forward. The first quadrant and the third quadrant take a symmetrical shape about a point while the second quadrant and the fourth quadrant also take a symmetrical shape about a point because, in the above-described each pair of quadrants, the rotor rotates in reverse direction, but the direction of the torque produced in the rotor is the same.

Furthermore, the motor speed is plus in the direction of R1 and minus in the direction of R2 in FIG. 1. In FIG. 6, in the case of the first quadrant, that is, in the power running mode, although torque ripple is large, the maximum power of the torque increases as compared to that in the case of the regenerative running mode.

On the other hand, in the fourth quadrant, torque ripple is reduced and improved, but less torque is produced.

FIG. 7 is a diagram for describing an improvement of torque ripple in the case where a cut is provided in the salient pole.

Referring to FIG. 7, a tip portion without a cut causes large torque ripple as a waveform W5 shown in the broken line. However, a tip portion with a cut causes small torque ripple as shown in a waveform W6. In the second and fourth quadrants in FIG. 6, the effect of providing the cut allows torque ripple to be reduced.

FIG. 8 is a diagram showing the change in the torque ripple ratio before and after a cut is provided at the tip portion.

As shown in FIG. 8, before the measures against torque ripple is taken, that is, in the case where a cut is not provided at the tip portion of the salient pole of the rotor, the torque ripple ratio is 67% both in a regenerative running forward rotation mode and in a power running forward rotation mode. However, if the cut shown in FIG. 3 is provided on one side of the tip portion of the salient pole of the rotor, the torque ripple ratio is reduced to 23% in the case of the regenerative running forward rotation mode, that is, the fourth quadrant in FIG. 6. In the case of the power running forward rotation mode, that is, the first quadrant in FIG. 6, the torque ripple ratio is increased to 80%.

FIG. 9 is diagram showing an actual measurement example of a noise level of the vehicle drive system of the present invention.

Referring to FIG. 9, in the case where the salient pole of the rotor is asymmetrical, a graph X1 represents a noise level in the power running forward rotation mode, and a graph X2 represents a noise level in the regenerative running forward rotation mode. It is assumed that the larger torque ripple causes a higher noise level, and the smaller torque ripple causes a lower noise level.

As can be seen from FIG. 9, the noise level of the graph X2 is lower than that of the graph X1. In particular, a region in which the motor speed is 2500 to 3000 rpm is often used for regenerative braking, and the noise in this region especially bothers the driver, and therefore, the effect of the noise reduction will be expected. In other words, while driving the vehicle, the region designated by C in FIG. 9 is used in regenerative braking.

Figure 10:
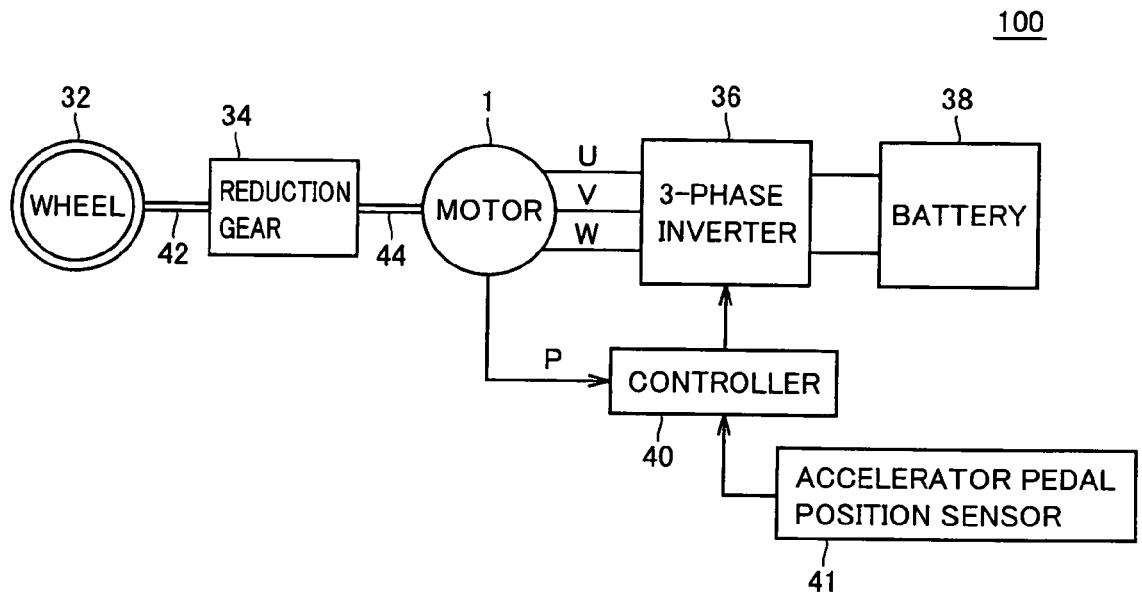
FIG. 10 is a diagram showing a configuration of a vehicle drive system 100 of the present invention.

FIG. 10 is a diagram showing a configuration of vehicle drive system 100 of the present invention.

Referring to FIG. 10, vehicle drive system 100 includes a battery 38, a 3-phase inverter 36 receiving energy from battery 38 in the power running mode and returning the energy into the battery in the regenerative running mode, and rotating electric machine 1 controlling current and voltage for coils of a U-phase, a V-phase and a W-phase by 3-phase inverter 36. Three-phase inverter 36 includes a power semiconductor element such as IGBT which is not shown.

Vehicle drive system 100 further includes an accelerator pedal position sensor 41 detecting the accelerator pedal position of the driver, and a controller 40 receiving rotation information P from the motor to control 3-phase inverter 36 in response to an output of accelerator pedal position sensor 41. Controller 40 includes a CPU, ROM, RAM and the like, which are not shown.

Vehicle drive system 100 further includes a reduction gear 34 connected to an output shaft 44 of the motor and a wheel 32 connected to an output shaft 42 of reduction gear 34.

Figure 11:
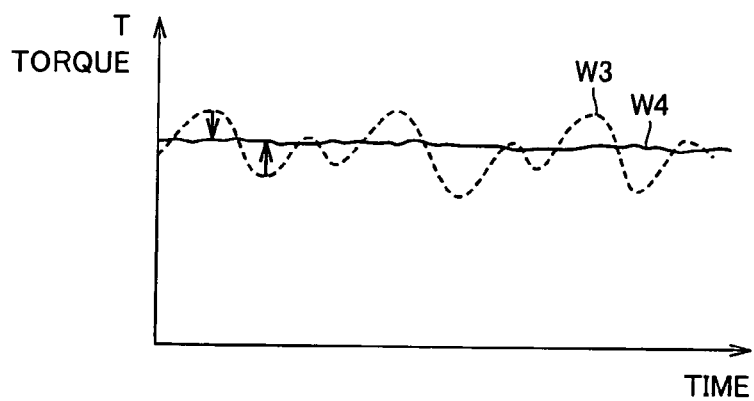
FIG. 11 is a diagram for describing measures for reducing torque ripple by a controller 40.

FIG. 11 is a diagram for describing measures for reducing torque ripple taken by controller 40.

Referring to FIGS. 10 and 11, controller 40 receives rotation information P from rotating electric machine 1 to instruct 3-phase inverter 36 to feed a compensation current in accordance with the phase at which torque ripple is produced. This results in averaging of respective peaks and valleys of torque by the compensation current, and a waveform W3 in which torque ripple is caused is improved to become like a waveform W4.

However, because the capability of controller 40 is limited, such measures against torque ripple by the compensation current is difficult to take during high speed running.

Figure 12:
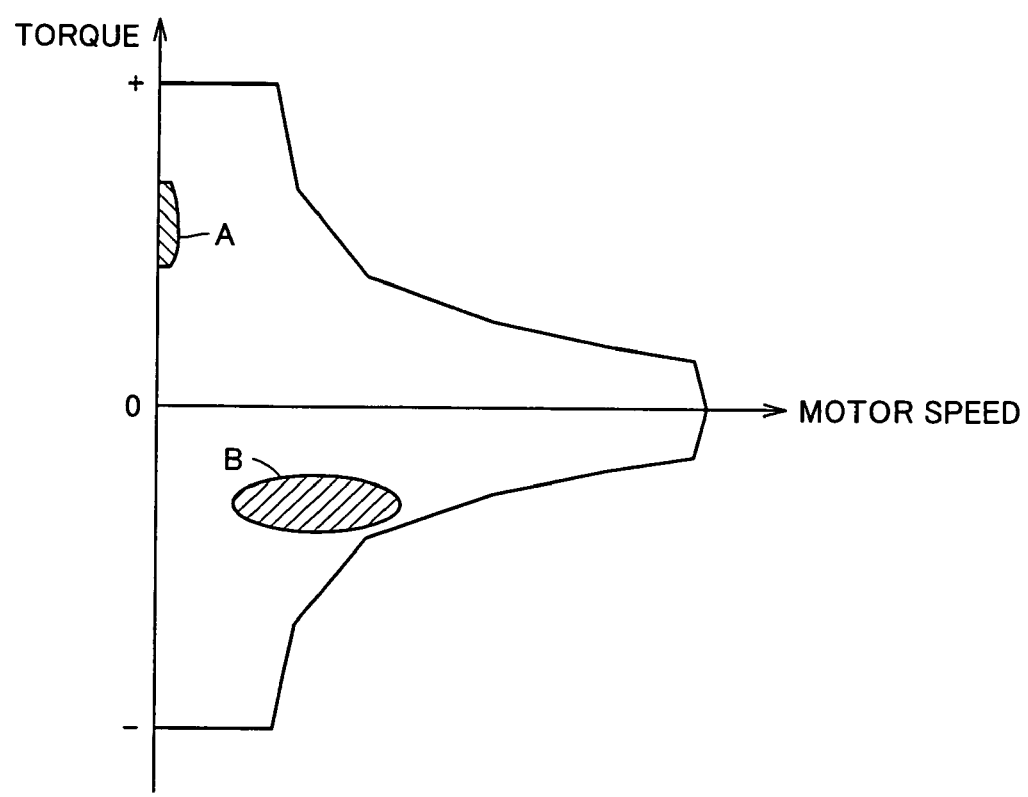
FIG. 12 is a diagram for describing measures taken against torque ripple by the vehicle drive system of the present invention.

FIG. 12 is a diagram for describing measures taken against torque ripple by the vehicle drive system of the present invention.

Referring to FIG. 12, a region A is where vibration becomes a problem while driving in a creep state at very low speed in the power running mode.

In this region A, the motor speed is low, that is, the vehicle speed is low. The controller has a sufficient ability to control the compensation current in the case of low vehicle speed, so that torque ripple can be reduced by feeding a torque compensation current. The structure of the rotor shown in FIGS. 1 to 3 may cause an increase in torque ripple to some degree in region A. However, the increased amount of torque ripple can also be resolved through the measures by the torque compensation current. Therefore, it is possible to take measures against torque ripple without causing a decrease in the average torque caused by the rotor structure in a power running mode.

Even in the power running mode, as the speed of the motor increases and the vehicle speed increases, torque ripple does not bother the driver too much owing to inertia exerted on the vehicle weight.

On the other hand, during very low speed running, the vehicle is braked, not by regenerative braking of the motor, but by a friction brake. The regenerative running of the motor is performed in a region in which the motor speed is approximately 2500 to 3000 rpm, as described in FIG. 9. Because an inertial force acts in this region, torque ripple is less perceivable than during low speed running. However, it is known that the driver is more sensitive to noise in a regenerative running mode where speed is reduced than in a power running mode where speed is increased.

A region B is where noise from the rotating electric machine poses a problem at the time of braking in the regenerative running mode. In this region B, because the speed of the motor is high, if the torque compensation current is to be fed, a process higher in rate than the controllable cycle of the controller is necessary. Thus, in light of the capability of the controller, it is difficult to reduce torque ripple by the torque compensation current. Therefore, in region B, measures against torque ripple are taken based on the structure of the rotor.

The regenerative running mode is not performed during low speed running but is often performed during high speed running. As for the regenerative running mode, measures against torque ripple are taken based on the structure of the rotating electric machine in the present invention. As for the power running mode in which the driver is bothered by noise during very low speed running, the controller allows the compensation current to be fed to take measures against torque ripple. This enables the noise and vibration both in regions A and B to be reduced.

Furthermore, although the present embodiment illustrates an example in the case of the salient pole having four poles, the number of the salient pole is not limited to four, and may be more or less than that.

In addition, although the present embodiment illustrates an example as to a reluctance motor, the present invention can also be suitably applied to a permanent magnet motor having a permanent magnet embedded in a rotor or a stator. By devising the position and the like for embedding the permanent magnet, it is possible to gain an effect similar to that in the case in which the cut shown in FIG. 3 is provided in the salient pole. As for the motor, measures against torque ripple may be taken for region A in FIG. 12 by the compensation current.

It will be understood that the embodiments of the present invention disclosed herein are by way of example only, and are not to be taken by way of limitation. The scope of the present invention is defined not by the above-described description but by the appended claims, and all changes that fall within limits and bounds of the claims, or equivalence of such limits and bounds are therefore intended to be embraced by the claims.

The invention claimed is:

1. A vehicle drive system comprising:
   a rotating electric machine capable of rotating about an output shaft in a forward direction and in a reverse direction in which torque ripple is smaller than torque ripple in the forward direction;
   a rotation shaft rotating in a direction to move a vehicle forward according to the rotation of the output shaft in the forward direction;
   a direct-current power source;
   an inverter placed on a current feeding and receiving path between the direct-current power source and the rotating electric machine; and
   a control unit gaining rotation information from the rotating electric machine to control the inverter, wherein
      the control unit controls the inverter such that torque in the forward direction is produced in a rotor in response to an acceleration instruction to cause the rotating electric machine to run in a power mode, and torque in the reverse direction is produced in the rotor in response to a deceleration instruction to cause the rotating electric machine to run in a regenerative mode.

2. The vehicle drive system of claim 1, wherein the rotating electric machine comprises:
a stator; and
the rotor shaped to cause smaller torque ripple when rotating in the reverse direction than in the forward direction.

3. The vehicle drive system of claim 2, wherein the rotor further comprises a plurality of salient pole portions, and each tip portion of the plurality of salient pole portions has a large chipped portion at a corner on the side in the reverse direction relative to a corner on the side in the forward direction.

4. A vehicle drive system comprising:
a rotating electric machine having a structure capable of rotating about an output shaft in a forward direction and in a reverse direction in which torque ripple is smaller than torque ripple in the forward direction;
a rotation shaft rotating in a direction to move a vehicle forward according to the rotation of the output shaft in the forward direction;
a direct-current power source;
an inverter placed on a current feeding and receiving path between the direct-current power source and the rotating electric machine; and
a control unit gaining rotation information from the rotating electric machine to control the inverter, wherein
the control unit instructs the inverter to feed a compensation current in accordance with the rotation information so as to reduce torque ripple of the rotating electric machine in a part of a rotation region when in a power running mode of the rotating electric machine to move the vehicle forward.

5. The vehicle drive system of claim 4, wherein the one part of the rotation region is a rotation region which corresponds to a region in which the vehicle runs in a creep state.

6. A vehicle comprising:
a vehicle drive system comprising
a rotating electric machine having a structure capable of rotating about an output shaft in a forward direction and in a reverse direction in which torque ripple is smaller than torque ripple in the forward direction,
a rotation shaft rotating in a direction to move a vehicle forward according to the rotation of the output shaft in the forward direction,
a direct-current power source,
an inverter placed on a current feeding and receiving path between the direct-current power source and the rotating electric machine, and
a control unit gaining rotation information from the rotating electric machine to control the inverter, wherein
the control unit controls the inverter such that torque in the forward direction is produced in a rotor in response to an acceleration instruction to cause the rotating electric machine to run in a power mode, and torque in the reverse direction is produced in the rotor in response to a deceleration instruction to cause the rotating electric machine to run in a regenerative mode; and
a wheel connected to the rotation shaft.

7. The vehicle of claim 6, wherein the rotating electric machine further comprises:
a stator; and
the rotor shaped to cause smaller torque ripple when rotating in the reverse direction than in the forward direction.

8. The vehicle of claim 7, wherein the rotor further comprises a plurality of salient pole portions, and each tip portion of the plurality of salient pole portion has a large chipped portion at a corner on the side in the reverse direction relative to a corner on the side in the forward direction.

9. A vehicle comprising:
a vehicle drive system comprising
a rotating electric machine having a structure capable of rotating about an output shaft in a forward direction and in a reverse direction in which torque ripple is smaller than torque ripple in the forward direction,
a rotation shaft rotating in a direction to move a vehicle forward according to the rotation of the output shaft in the forward direction,
a direct-current power source,
an inverter placed on a current feeding and receiving path between the direct-current power source and the rotating electric machine, and
a control unit gaining rotation information from the rotating electric machine to control the inverter, wherein
the control unit instructs the inverter to feed a compensation current in accordance with the rotation information so as to reduce torque ripple of the rotating electric machine in a part of a rotation region when in a power running mode of the rotating electric machine to move the vehicle forward; and
a wheel connected to the rotation shaft.

10. The vehicle of claim 9, wherein the one part of the rotation region is a rotation region which corresponds to a region in which the vehicle runs in a creep state.

* * * * *